US010965388B2

(12) United States Patent
Patel et al.

(10) Patent No.: US 10,965,388 B2
(45) Date of Patent: Mar. 30, 2021

(54) SENSORS WITH MULTIPLE ANTENNAE USED FOR MULTI-DIMENSIONAL LOCATION OF AN OBJECT

(71) Applicant: SIGNIFY HOLDING B.V., Eindhoven (NL)

(72) Inventors: Vrajesh Upendrabhai Patel, Tucker, GA (US); Leonardo Enrique Matute, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 71 days.

(21) Appl. No.: 16/368,519

(22) Filed: Mar. 28, 2019

(65) Prior Publication Data
US 2019/0305858 A1    Oct. 3, 2019

Related U.S. Application Data

(60) Provisional application No. 62/649,407, filed on Mar. 28, 2018.

(51) Int. Cl.
*G01S 5/04*     (2006.01)
*H04B 17/27*    (2015.01)

(52) U.S. Cl.
CPC ............... *H04B 17/27* (2015.01); *G01S 5/04* (2013.01)

(58) Field of Classification Search
CPC .......................................... G01S 3/38
See application file for complete search history.

(56) References Cited

U.S. PATENT DOCUMENTS

| 6,784,826 B2 | 8/2004 | Kane |
| 10,422,848 B1 | 9/2019 | Li |
| 2002/0122006 A1 | 9/2002 | Crawford |
| 2004/0183726 A1 | 9/2004 | Theobold |

(Continued)

FOREIGN PATENT DOCUMENTS

WO    WO 2014/131074    9/2014

OTHER PUBLICATIONS

"Grating lobe suppression in an array antenna with element spacing greater than a half wavelength" by Suda et al., 2010 IEEE Antennas and Propagation Society International Symposium (Year: 2010).*

(Continued)

*Primary Examiner* — Joshua L Schwartz
(74) *Attorney, Agent, or Firm* — Meenakshy Chakravorty

(57) ABSTRACT

A system for locating an object in a volume of space can include a sensor device having multiple antennae, and a switch coupled to the antennae. The system can also include a controller communicably coupled to the switch, where the controller measures a first angle of a signal received at a first antenna, where the first angle of the signal is associated with a location of the object. The controller also operates the switch from a first position to a second position, where the first position enables the first antenna, and where the second position enables a second antenna. The controller further measures a second angle of the signal received at the second antenna, where the second angle of the signal is associated with the location of the object. The controller also determines, using the first angle and the second angle, a multi-dimensional location of the object.

18 Claims, 11 Drawing Sheets

(56) References Cited

U.S. PATENT DOCUMENTS

| | | |
|---|---|---|
| 2005/0156794 A1 | 7/2005 | Theobold |
| 2007/0262872 A1 | 11/2007 | Carrender |
| 2012/0050017 A1 | 3/2012 | Barry |
| 2012/0218978 A1 | 8/2012 | Ishidoshiro |
| 2012/0302261 A1 | 11/2012 | Tinnakornsrisu |
| 2013/0170374 A1 | 7/2013 | Aljadeff |
| 2013/0260693 A1 | 10/2013 | Un |
| 2013/0342402 A1 | 12/2013 | Pesonen |
| 2014/0327579 A1* | 11/2014 | Hart ............... G01S 3/38 342/374 |
| 2015/0099538 A1 | 4/2015 | Wang |
| 2016/0139237 A1 | 5/2016 | Connolly |
| 2016/0240492 A1* | 8/2016 | Wolter ............... H01Q 1/526 |
| 2016/0345286 A1 | 11/2016 | Jamieson |
| 2018/0052217 A1 | 2/2018 | Jonsson |
| 2018/0096179 A1 | 4/2018 | Dang |

OTHER PUBLICATIONS

International Search Report for PCT/EP2019/025092, dated Sep. 30, 2019.

* cited by examiner

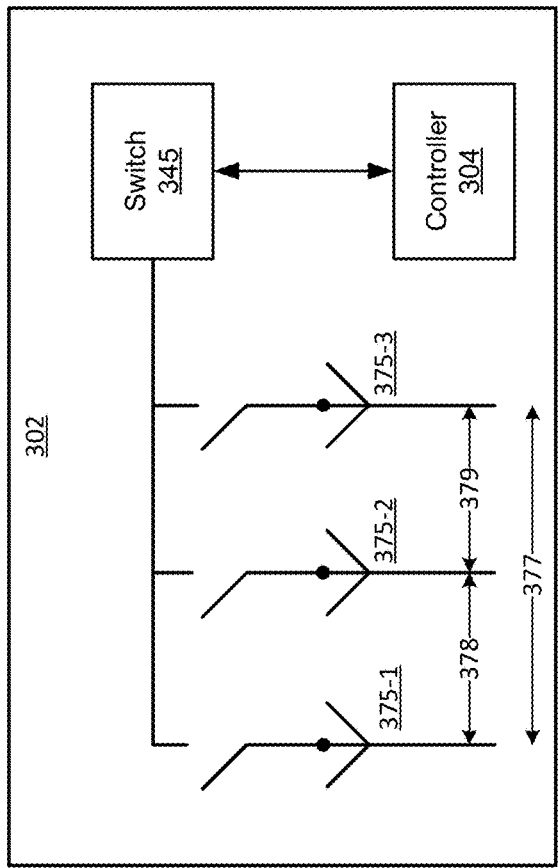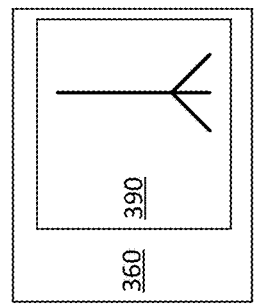
FIG. 3

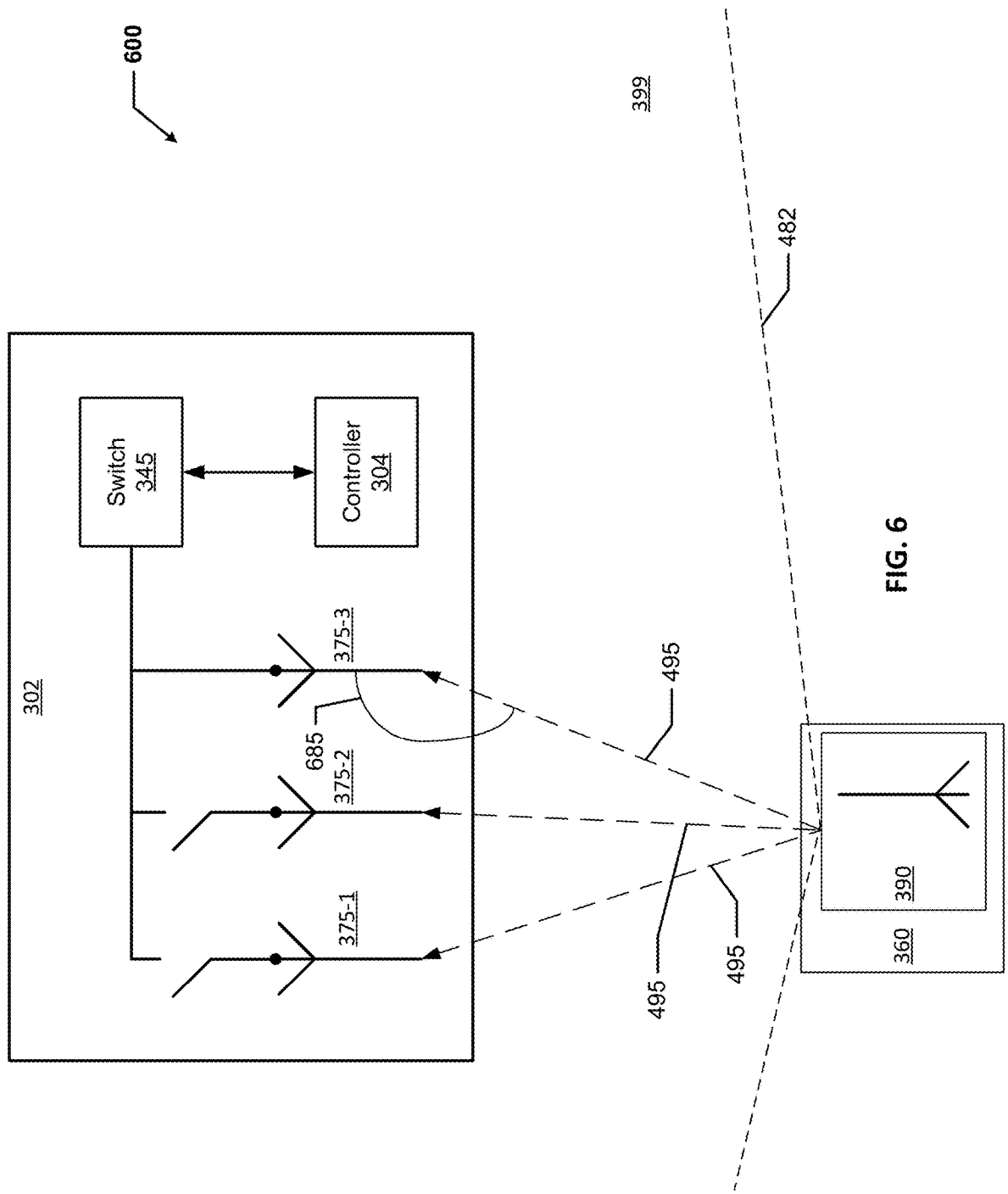

SENSORS WITH MULTIPLE ANTENNAE USED FOR MULTI-DIMENSIONAL LOCATION OF AN OBJECT

RELATED APPLICATIONS

This application claims priority under 35 U.S.C. § 119 to U.S. Provisional Patent Application Ser. No. 62/649,407, titled "Sensors With Multiple Antennae Used For Multi-Directional Location of an Object" and filed on Mar. 28, 2018, the entire contents of which are hereby incorporated herein by reference.

TECHNICAL FIELD

Embodiments described herein relate generally to locating objects in a space, and more particularly to systems, methods, and devices involving sensors with multiple antennae used for locating objects.

BACKGROUND

Different methods are used to locate an object within a volume of space. For example, when signals are involved, the Received Signal Strength Indication (RSSI) of each signal can be measured to help determine the location of an object within a volume of space. In such cases, only a single antenna is used. Further, methods currently used in the art rely mostly on strength of signal. As a result, embodiments currently using signals in the art locate an object in only a single dimension, and so are not very accurate.

SUMMARY

In general, in one aspect, the disclosure relates to a system for locating an object in a volume of space. The system can include a sensor device having a plurality of antennae, and a switch coupled to the plurality of antennae. The system can also include a controller communicably coupled to the switch. The controller measures, at a first time, a first angle of a signal received at a first antenna of the plurality of antennae, where the first angle of the signal is associated with a location of the object. The controller also operates the switch from a first position to a second position, where the first position enables the first antenna, and where the second position enables a second antenna of the plurality of antennae. The system further measures, at a second time, a second angle of the signal received at the second antenna of the plurality of antennae, where the second angle of the signal is associated with the location of the object. The controller also determines, using the first angle and the second angle, a multi-dimensional location of the object in the volume of space.

In another aspect, the disclosure can generally relate to a sensor device that includes a housing and a plurality of antennae disposed on an outer surface of the housing. The sensor device can also include a switch coupled to the plurality of antennae, and a controller communicably coupled to the switch. The controller can be configured to measure, at a first time, a first angle of a signal received at a first antenna of the plurality of antennae, where the first angle of the signal is associated with a location of the object. The controller can also be configured to operate the switch from a first position to a second position, where the first position enables the first antenna, and where the second position enables a second antenna of the plurality of antennae. The controller can further be configured to measure, at a second time, a second angle of the signal received at the second antenna of the plurality of antennae, where the second angle of the signal is associated with the location of the object. The controller can also be configured to determine, using the first angle and the second angle, a multi-dimensional location of the object in the volume of space.

These and other aspects, objects, features, and embodiments will be apparent from the following description and the appended claims.

BRIEF DESCRIPTION OF THE DRAWINGS

The drawings illustrate only example embodiments of sensors (also called sensor devices herein) with multiple antennae used for multi-dimensional location of an object and are therefore not to be considered limiting of its scope, as sensors with multiple antennae used for multi-dimensional location of an object may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIG. 3 shows a system in which an object is located in a volume of space in accordance with certain example embodiments.

FIGS. 4-6 show the system of FIG. 3 where the object is located in a volume of space using an angle of arrival (AoA) method in accordance with certain example embodiments.

DETAILED DESCRIPTION OF EXAMPLE EMBODIMENTS

Figure 1:
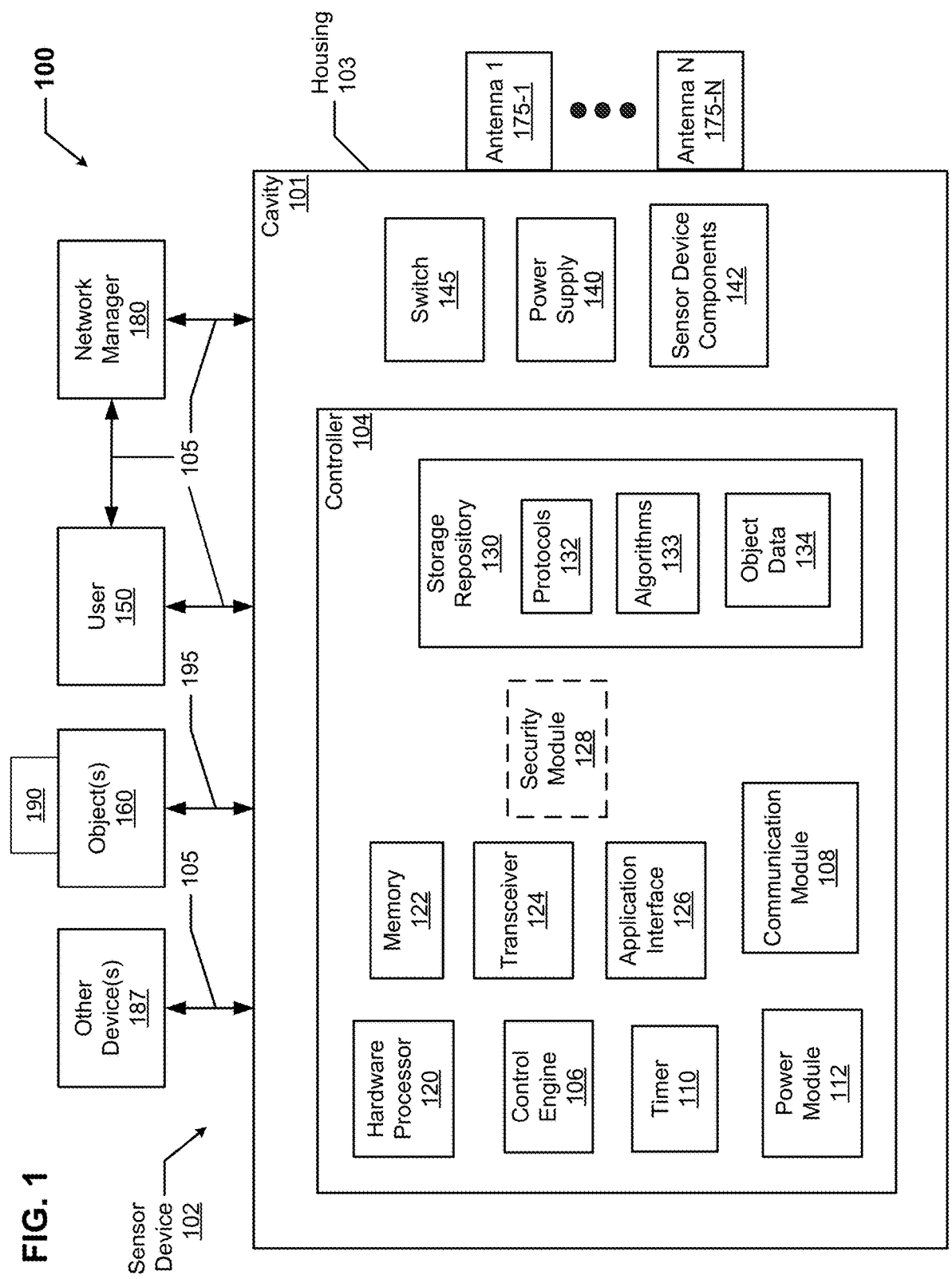
FIG. 1 shows a diagram of a system that includes a sensor device in accordance with certain example embodiments.

The example embodiments discussed herein are directed to systems, methods, and devices for sensors with multiple antennae used for multi-dimensional location of an object. While example embodiments are described herein as using multiple antennae disposed on a sensor device to locate an object in a volume of space, example embodiments can use one or more of a number of other electrical devices in addition to, or as an alternative to, sensor devices. Such other electrical devices can include, but are not limited to, a light switch, a control panel, a wall outlet, and a camera.

Example embodiments can be used for a volume of space having any size and/or located in any environment (e.g., indoor, outdoor, hazardous, non-hazardous, high humidity, low temperature, corrosive, sterile, high vibration). Further, while signals described herein are radio frequency (RF) signals, example embodiments can be used with any of a number of other types of signals, including but not limited to WiFi, Bluetooth, Bluetooth low energy (BLE), RFID, ultraviolet waves, microwaves, and infrared signals. Example embodiments can be used to locate, in multiple dimensions, an object in a volume of space in real time (also called real-time location services or RTLS).

Example embodiments of sensor devices described herein can be used to measure one or more of a number of different parameters, including but not limited to occupancy, motion, noise, ambient light, carbon monoxide, smoke, and temperature. Therefore, sensor devices described herein, even in hazardous locations, should not be considered limited to a particular type of sensor device and/or used for a particular purpose.

Example embodiments provide a highly accurate two- or three-dimensional location of an object in a volume of space. Further, example embodiments can provide high locational accuracy (as compared, for example, to using RSSI). In addition, example embodiments, provide a high level of data security if such security is desired by a user. Example embodiments are also more reliable, using low amounts of power on demand.

In certain example embodiments, sensors with multiple antennae used for multi-dimensional location of an object are subject to meeting certain standards and/or requirements. For example, the National Electric Code (NEC), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures (e.g., light fixtures), wiring, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of sensors with multiple antennae used for multi-dimensional location of an object will be described more fully hereinafter with reference to the accompanying drawings, in which example embodiments of sensors with multiple antennae used for multi-dimensional location of an object are shown. Sensors with multiple antennae used for multi-dimensional location of an object may, however, be embodied in many different forms and should not be construed as limited to the example embodiments set forth herein. Rather, these example embodiments are provided so that this disclosure will be thorough and complete, and will fully convey the scope of sensors with multiple antennae used for multi-dimensional location of an object to those of ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and they are not meant to limit embodiments of sensors with multiple antennae used for multi-dimensional location of an object. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 that includes a sensor device 102 in accordance with certain example embodiments. The system 100 can include one or more objects 160, a user 150, a network manager 180, and one or more other devices 187, some or all of which can be located in a volume of space 199. The sensor device 102 can include a controller 104, multiple antennae 175, a switch 145, a power supply 140, and a number of sensor device components 142. The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128.

The components shown in FIG. 1 are not exhaustive, and in some embodiments, one or more of the components shown in FIG. 1 may not be included in the example system 100. Also, the particular configuration of the system 100 and its various components shown in FIG. 1 is not to be considered limiting. For instance, any component of the example sensor device 102 can be discrete or combined with one or more other components of the sensor device 102. For example, rather than one switch 145, there can be multiple switches 145. As another example, instead of a single sensor device 102 with multiple antennae 175, the system 100 can have multiple sensor devices 102, each with one antenna 175, that are communicably coupled to each other. As yet another example, the switch 145 can be part of the controller 104. As still another example, the controller 104 can be an independent component (or part of another component, such as the network manager 180) that is physically separate from but communicably coupled to the rest of the sensor device 102.

A user 150 may be any person that interacts with a sensor device 102 and/or object 160 in the volume of space 199. Specifically, a user 150 may program, operate, and/or interface with one or more components (e.g., a controller 104, a network manager 180) associated with the system 100 using example embodiments. Examples of a user 150 may include, but are not limited to, an engineer, an electrician, an instrumentation and controls technician, a mechanic, an operator, a consultant, a contractor, an asset, a network manager, and a manufacturer's representative.

The user 150 can use a user system (not shown), which may include a display (e.g., a GUI). The user 150 interacts with (e.g., sends data to, receives data from) the controller 104 of a sensor device 102 via the application interface 126 (described below). The user 150 can also interact with a network manager 180 and/or one or more of the objects 160. Interaction between the user 150, the sensor device 102, and the network manager 180 is conducted using communication links 105.

Each communication link 105 can include wired (e.g., Class 1 electrical cables, Class 2 electrical cables, electrical connectors) and/or wireless (e.g., Wi-Fi, visible light communication, cellular networking, Bluetooth, WirelessHART, ISA100, Power Line Carrier, RS485, DALI) technology. For example, a communication link 105 can be (or include) one or more electrical conductors that are coupled to the housing 103 of a sensor device 102 and to the network manager 180. The communication link 105 can transmit signals (e.g., power signals, communication signals, control signals, data) between the sensor device 102, the user 150, and the network manager 180. By contrast, the sensor device 102 of the system 100 can interact with the one or more objects 160 using location signals 195, as discussed below. The one or more objects 160 can communicate with the user 150 and/or the network manager 180 using the communication links 105.

The network manager 180 is a device or component that controls all or a portion of the system 100 that includes the controller 104 of the sensor device 102. The network manager 180 can be substantially similar to the controller 104. Alternatively, the network manager 180 can include one or more of a number of features in addition to, or altered from, the features of the controller 104 described below.

Another device 187 can be one or more of a number of devices and/or systems that communicate with the sensor device 102. Examples of such another device 187 can include, but are not limited to, a light fixture, a lighting system, a thermostat, another sensor device, a security system, a fire protection system, a HVAC system, and a wireless router.

As defined herein, an object 160 can be any unit or group of units. An object 160 can move on its own, is capable of being moved, or is stationary. Examples of an object 160 can include, but are not limited to, a person (e.g., a user 150, a visitor, an employee), a part (e.g., a motor stator, a cover), a piece of equipment (e.g., a fan, a container, a table, a chair), or a group of parts of equipment (e.g., a pallet stacked with inventory). Each object 160 is located in the volume of space 199.

Each object 160 can include a communication device 190, which can send RF signals 195 to the sensor device 102. The communication device 190 can include one or more components (e.g., switch, antenna, transceiver) of a sensor device 102 and/or functionality described below with respect to a controller 104 of a sensor device 102. For example, one or more of the antennae 175 of the sensor device 102 can be used for both locating an object 160 and communicating with user 150 and the network manager 180.

Using example embodiments, the communication device 190 (also sometimes called a beacon 190) of the object 160 can be in sleep mode until the communication device 190 is awakened by some event or passage of time. When this occurs, the communication device 190 can turn on long enough to interpret the initial RF signal 195 broadcast by one or more antennae 175 of the sensor device 102, and then generate and send its own RF signal 195 to the sensor device 102 in response to the initial RF signal 195.

Alternatively, the communication device 190 of the object 160 can be in sleep mode until some pre-determined point in time (e.g., every hour, every 24 hours) that is independent of the antennae 175 of the sensor device 102. When this occurs, the communication device 190 can turn on long enough to send a RF signal 195 to the sensor device 102 so that all of the antennae 175 of the sensor device 102 receive the RF signal 195. This latter embodiment can be used with AoA methods of locating the object 160. In any case, the RF signal 195 can include a UUID (or some other form of identification) associated with the object 160. Once the RF signal 195 is sent by the communication device 190, the communication device 190 can go back into sleep mode, thereby reserving a considerable amount of power.

The communication device 190 can use one or more of a number of communication protocols in sending the RF signals 195 with the antennae 175 of the sensor device 102. In certain example embodiments, an object 160 can include a battery (a form of power supply or power module) that is used to provide power, at least in part, to some or all of the rest of the object 160, including the communication device 190.

The user 150, the network manager 180, and/or any other devices 187 can interact with the controller 104 of the sensor device 102 using the application interface 126 in accordance with one or more example embodiments. Specifically, the application interface 126 of the controller 104 receives data (e.g., information, communications, instructions) from and sends data (e.g., information, communications, instructions) to the user 150 and the network manager 180. The user 150 and the network manager 180 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, and the network manager 180 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, or other network communication methods) and/or communication channels, with wire and/or wireless segments according to some example embodiments. The software of one system can be a part of, or operate separately but in conjunction with, the software of another system within the system 100.

The sensor device 102 can be a stand-alone device that is not part of a larger system. Alternatively, the sensor device 102 can be integrated with a system. Examples of such a system can include, but are not limited to, a lighting system, a security system, a fire protection system, a HVAC system, and an emergency egress system. As discussed above, the sensor device 102 can measure one or more parameters that can be used in the operation of one or more such systems.

The sensor device 102 can include a housing 103. The housing 103 can include at least one wall that forms a cavity 101. In some cases, the housing 103 can be designed to comply with any applicable standards so that the sensor device 102 can be located in a particular environment (e.g., a hazardous environment). For example, if the sensor device 102 is located in an explosive environment, the housing 103 can be explosion-proof. According to applicable industry standards, an explosion-proof enclosure is an enclosure that is configured to contain an explosion that originates inside, or can propagate through, the enclosure. In any case, one or more of the antennae 175 can be disposed on the outer surface of the housing 103 in certain example embodiments.

The housing 103 of the sensor device 102 can be used to house one or more components of the sensor device 102, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), the power supply 140, the antennae 175, the switch 145, and the sensor device components 142 are disposed in the cavity 101 formed by the housing 103. In alternative embodiments, any one or more of these or other components of the sensor device 102 can be disposed on the housing 103 and/or remotely from the housing 103.

The storage repository 130 can be a persistent storage device (or set of devices) that stores software and data used to assist the controller 104 in communicating with the user 150, the network manager 180, and one or more of the objects 160, and any other applicable sensor device 102 within the system 100. In one or more example embodiments, the storage repository 130 stores one or more protocols 132, one or more algorithms 133, and object data 134. The protocols 132 can be any procedures (e.g., a series of method steps) and/or other similar operational procedures that the control engine 106 of the controller 104 follows based on certain conditions at a point in time.

The protocols 132 can also include any of a number of communication protocols that are used to send and/or receive data between the controller 104 and the user 150, the network manager 180, any other applicable devices 187, and one or more of the objects 160. One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100.

The algorithms 133 can be any formulas, mathematical models, forecasts, simulations, and/or other similar operational procedures that the control engine 106 of the controller 104 uses to perform certain calculations, forecasts, trending analysis, estimates, and any other useful types of data to locate the object 160. An example of an algorithm 133 is a formula or model that calculates an angle at which a signal is received by an antenna 175. Another example of an algorithm 133 is a formula or model that uses the angle of signal received by multiple antennae 175 to determine the location of an object 160 in a volume of space 199. Another example of one or more algorithms 133 is a formula or model that can track movement of an object 160 in the volume of space 199 based on signals received by the antennae 175 over a period of time.

Object data 134 can be any data associated with each object 160 that is communicably coupled to the controller 104. Such data can include, but is not limited to, a manufacturer of the object 160, a model number of the object 160, communication capability of an object 160, last known location of the object 160, and age of the object 160. Examples of a storage repository 130 can include, but are not limited to, a database (or a number of databases), a file system, a hard drive, flash memory, some other form of solid state data storage, or any suitable combination thereof.

The storage repository 130 can also include any other kind of data, including but not limited to user preferences, threshold values, default values, historical data, present data, and forecasts. The storage repository 130 can be located on multiple physical machines, each storing all or a portion of the protocols 132, the algorithms 133, and/or the object data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, any other devices 187, and the objects 160 in the system 100. More specifically, the control engine 106 sends information to and/or receives information from the storage repository 130 in order to communicate with the user 150, the network manager 180, any other devices 187, and the objects 160. As discussed below, the storage repository 130 can also be operatively connected to the communication module 108 in certain example embodiments.

In certain example embodiments, the control engine 106 of the controller 104 controls the operation of one or more other components (e.g., the communication module 108, the timer 110, the transceiver 124) of the controller 104. For example, the control engine 106 can put the communication module 108 in "sleep" mode when there are no communications between the controller 104 and another component (e.g., an object 160, the user 150) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to receive, through the switch 145 and one or more of the antennae 175, RF signals 195 from one or more objects 160 in the system 100. This example provides another instance where the control engine 106 can conserve power used by the controller 104 and other components (e.g., the objects 160) of the system 100.

The control engine 106 can determine when to receive one or more RF signals 195 in an attempt to locate an object 160 in the volume of space 199. To conserve energy, the control engine 106 does not constantly receive RF signals 195, but rather only does so at discrete times. The control engine 106 can be active to receive a RF signal 195 based on one or more of a number of factors, including but not limited to passage of time, the occurrence of an event, instructions from a user 150, and a command received from the network manager 180.

In some cases, when the system 100 includes multiple sensor devices (part of the other devices 187), each sensor device can have some form of a controller 104. The control engine 106 of one controller 104 can coordinate with the controllers 104 of the other sensor devices and/or directly control one or more of the other sensor devices to broadcast multiple RF signals 195 and/or receive multiple RF signals 195. In this example, the control engine 106 can operate one or more switches 145 to accomplish its function.

In some cases, the control engine 106 of the sensor device 102 can locate the object 160 in the volume of space based on the multiple RF signals 195 sent by (e.g., originated from, reflected off of) the object 160 in response to the multiple RF signals 195 broadcast by the sensor device 102. To accomplish this, the control engine 106 obtains the multiple RF signals 195 (directly from the antennae 175 through the switch 145 and/or from another control engine 106 from one or more of the other devices 187) broadcast by the object 160 and/or reflected from the object 160. The control engine 106 can also uses one or more protocols 132 and/or algorithms 133 to determine the multi-dimensional location of the object 160 based on the RF signals 195.

For example, the protocols 132 and/or algorithms 133 used by the control engine 106 can require the control engine 106 to determine the AoA and/or the angle of departure (AoD) of each RF signal 195 received from an object 160. The protocols 132 and/or algorithms 133 used by the control engine 106 to dictate when and how the control engine 106 operates the switch 145. As a result, the protocols 132 and/or algorithms 133 used by the control engine 106 can also assist the control engine 106 to determine the multi-dimensional location of one or more objects 160. If two antennae 175 are used, then a two-dimensional location of an object 160 can be obtained by the control engine 106. An example of how an object 160 can be located in the volume of space 199 using AoA is provided below with respect to FIGS. 3-6. An example of an algorithm 133 used by the control engine 106 can include, but is not limited to, angle=wavelength×difference in distance in space between antennae±2±π±distance between antennae.

The control engine 106 can provide control, communication, RF signals 195, and/or other signals to the user 150, the network manager 180, and one or more of the objects 160. Similarly, the control engine 106 can receive control, communication, RF signals 195, and/or other signals from the user 150, the network manager 180, one or more of the other devices 187, and one or more of the objects 160. The control engine 106 can communicate with each object 160 automatically (for example, based on one or more algorithms 133 stored in the storage repository 130) and/or based on control, communication, and/or other similar signals received from another device (e.g., the network manager 180) using the RF signals 195. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the sensor device 102. For example, if the power supply 140 of the sensor device 102 operates under IEC Standard 62386, then the power supply 140 can include a digital addressable lighting interface (DALI). In such a case, the control engine 106 can also include a DALI to enable communication with the power supply 140 within the sensor device 102. Such an interface can operate in conjunction with, or independently of, the communication protocols 132 used to communicate between the controller 104 and the user 150, the network manager 180, any other devices 187, and the objects 160.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

Using example embodiments, while at least a portion (e.g., the control engine 106, the timer 110) of the controller 104 is always on, the remainder of the controller 104 and the objects 160 can be in sleep mode when they are not being used. In addition, the controller 104 can control certain aspects (e.g., sending RF signals 195 to and receiving RF signals 195 from an object 160, operating a switch 145) of one or more other devices 187 in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112), even more power can be conserved in the operation of the system 100. In addition, using time-synchronized communication protocols 132, the data transferred between the controller 104 and the user 150, the network manager 180, and any other devices 187 can be secure.

The communication module 108 of the controller 104 determines and implements the communication protocol (e.g., from the protocols 132 of the storage repository 130) that is used when the control engine 106 communicates with (e.g., sends signals to, receives signals from) the user 150, the network manager 180, any other devices 187, and/or one or more of the objects 160. In some cases, the communication module 108 accesses the object data 134 to determine which communication protocol is within the capability of the object 160 for a RF signal 195 sent by the control engine 106. In addition, the communication module 108 can interpret the communication protocol of a communication (e.g., a RF signal 195) received by the controller 104 so that the control engine 106 can interpret the communication.

The communication module 108 can send data (e.g., protocols 132, object data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure multiple times simultaneously. The timer 110 can track time periods based on an instruction received from the control engine 106, based on an instruction received from the user 150, based on an instruction programmed in the software for the controller 104, based on some other condition or from some other component, or from any combination thereof.

The power module 112 of the controller 104 provides power to one or more other components (e.g., timer 110, control engine 106) of the controller 104. In addition, in certain example embodiments, the power module 112 can provide power to the power supply 140 of the sensor device 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the sensor device 102 and generates power of a type (e.g., alternating current, direct current) and level (e.g., 12V, 24V, 120V) that can be used by the other components of the controller 104 and/or by the power supply 140. In addition, or in the alternative, the power module 112 can be a source of power in itself to provide signals to the other components of the controller 104 and/or the power supply 140. For example, the power module 112 can be a battery. As another example, the power module 112 can be a localized photovoltaic power system.

The hardware processor 120 of the controller 104 executes software in accordance with one or more example embodiments. Specifically, the hardware processor 120 can execute software on the control engine 106 or any other portion of the controller 104, as well as software used by the user 150, and the network manager 180, and/or any other devices 187. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals, including RF signals 195. Specifically, the transceiver 124 can be used to transfer data between the controller 104 and the user 150, the network manager 180, any other devices 187, and/or the objects 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, any other devices 187, and/or the objects 160.

When the transceiver 124 uses wireless technology, any type of wireless technology can be used by the transceiver 124 in sending and receiving signals. Such wireless technology can include, but is not limited to, Wi-Fi, visible light communication, cellular networking, Bluetooth Low Energy (BLE), and Bluetooth. The transceiver 124 can use one or more of any number of suitable communication protocols (e.g., ISA100, HART) when sending and/or receiving signals, including RF signals 195. Such communication protocols can be stored in the protocols 132 of the storage repository 130. Further, any transceiver information for the user 150, the network manager 180, any other devices 187, and/or the objects 160 can be part of the object data 134 (or similar areas) of the storage repository 130.

Optionally, in one or more example embodiments, the security module 128 secures interactions between the controller 104, the user 150, the network manager 180, any other devices 187, and/or the objects 160. More specifically, the security module 128 authenticates communication from software based on security keys verifying the identity of the source of the communication. For example, user software may be associated with a security key enabling the software of the user 150 to interact with the controller 104 of the sensor device 102. Further, the security module 128 can restrict receipt of information, requests for information, and/or access to information in some example embodiments.

As mentioned above, aside from the controller 104 and its components, the sensor device 102 can include a power supply 140, multiple antennae 175, at least one switch 145, and one or more sensor device components 142. The sensor device components 142 of the sensor device 102 are devices and/or components typically found in a sensor device to allow the sensor device 102 to operate. A sensor device component 142 can be electrical, electronic, mechanical, or any combination thereof. The sensor device 102 can have one or more of any number and/or type of sensor device components 142. Examples of such sensor device components 142 can include, but are not limited to, a light source, a sensor, a heat sink, an electrical conductor or electrical cable, a terminal block, a lens, a diffuser, a reflector, an air moving device, a baffle, a dimmer, and a circuit board.

The power supply 140 of the sensor device 102 provides power to one or more of the sensor device components 142. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from or sends power to the power module 112 of the controller 104. The power supply can generate power of a type (e.g., alternating current, direct current) and level (e.g., 12V, 24V, 120V) that can be used by the recipients (e.g., the sensor device components 142, the controller 106) of such power. In addition, or in the alternative, the power supply 140 can receive power from a source external to the sensor device 102. In addition, or in the alternative, the power supply 140 can be a source of power in itself. For example, the power supply 140 can be a battery, a localized photovoltaic power system, or some other source of independent power.

As discussed above, the sensor device 102 includes multiple (e.g., two, three, five, nine, twenty) antennae 175. An antenna 175 is an electrical device that converts electrical power to RF signals 195 (for transmitting) and RF signals 195 to electrical power (for receiving). In transmission, a radio transmitter (e.g., transceiver 124) supplies, through the switch 145, an electric current oscillating at radio frequency (i.e. a high frequency alternating current (AC)) to the terminals of the antenna 175, and the antenna radiates the energy from the current as RF signals 195. In reception, an antenna 175 intercepts some of the power of RF signals 195 in order to produce a tiny voltage at its terminals, that is applied through the switch 145 to a receiver (e.g., transceiver 124) to be amplified.

An antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse RF signal 195 (often an electromagnetic field wave). Conversely, during reception, the oscillating electric and magnetic fields of an incoming RF signal 195 exert force on the electrons in the body of the antenna 175, causing portions of the body of the antenna 175 to move back and forth, creating oscillating currents in the antenna 175.

In certain example embodiments, an antenna 175 (e.g., antenna 175-1, antenna 175-N) can be disposed at, within, or on any portion of the sensor device 102. For example, an antenna 175 can be disposed on the outer surface of the housing 103 of the sensor device 102. As another example, an antenna 175 can be insert molded into the housing of the sensor device 102. As another example, an antenna 175 can be two-shot injection molded into the housing 103 of the sensor device 102. As yet another example, an antenna 175 can be adhesive-mounted onto the housing 103 of the sensor device 102. As still another example, an antenna 175 can be printed onto the outer surface of the housing 103 of the sensor device 102. As yet another example, an antenna 175 can be a chip ceramic antenna that is surface mounted. As still another example, an antenna 175 can be a wire antenna.

Each antenna 175 can be coupled (e.g., electrically, communicably) to the switch 145, which in turn is coupled (e.g., electrically, communicably) to the transceiver 124. The switch 145 can be a single switch device or a number of switch devices arranged in series and/or in parallel with each other. The switch 145 determines which antenna 175 is coupled to the transceiver 124 at any particular point in time. A switch 145 can have one or more contacts, where each contact has an open state and a closed state (position). In the open state, a contact of the switch 145 creates an open circuit, which prevents the transceiver 124 from delivering a RF signal 195 to or receiving a RF signal 195 from the antenna 175 electrically coupled to that contact of the switch 145. In the closed state, a contact of the switch 145 creates a closed circuit, which allows the transceiver 124 to deliver a RF signal 195 to or receive a RF signal 195 from the antenna 175 electrically coupled to that contact of the switch 145.

In certain example embodiments, the position of each contact of the switch 145 is controlled by the control engine 106 of the controller 104. If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments.

Figure 2:
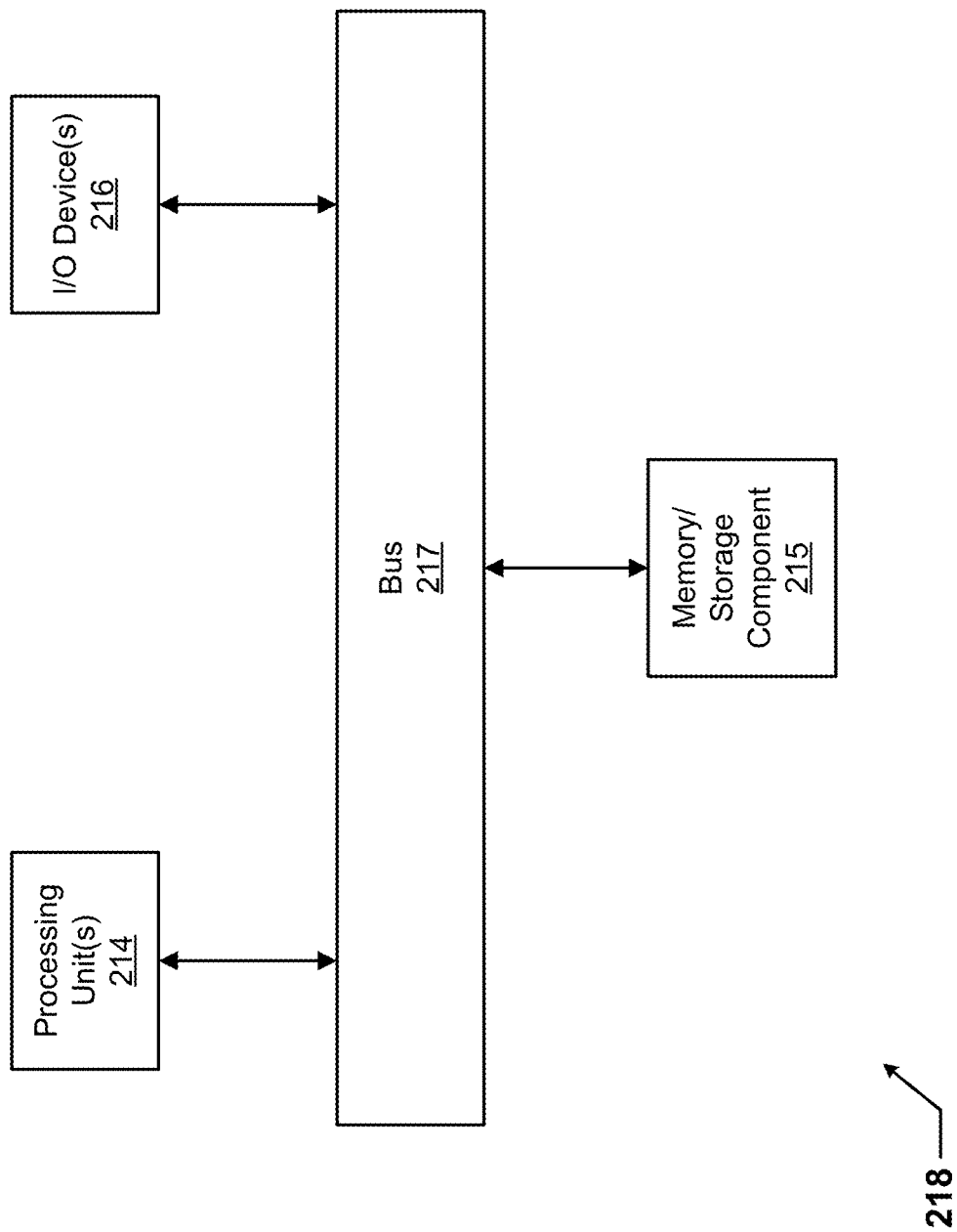
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. For example, the controller 104 (including its various components, such as the control engine 106, the hardware processor 120, and the storage repository 130) of the sensor device 102 of FIG. 1 can be considered a computing device 218. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

FIG. 3 shows a system 300 that can use an AoA method to locate an object 360 in a volume of space 399 in accordance with certain example embodiments. Referring to FIGS. 1 through 3, also located in the volume of space 399 of FIG. 3 is a sensor device 302 having three antennae 375 (antenna 375-1, antenna 375-2, and antenna 375-3). In this case, the antennae 375 are printed on an outer surface of the housing of the sensor device 302. As discussed above, the volume of space 399 can be of any size and/or in any location. For example, the volume of space 399 can be a room in an office building.

As shown in FIG. 3, all three of the antennae 375 of the sensor device 302 can be located in the volume of space 399. Alternatively, one or more of the antennae 375 can be located on another device (e.g., another sensor device). In any case, it is possible that one or more of the antennae 375 can be located outside the volume of space 399, as long as the RF signals (e.g., RF signals 195) sent by the communication device 390 of the object 360 are received by the antenna 375 of the sensor device 302.

In certain example embodiments, an antenna 375 is separated by one or more adjacent antenna 375 by some distance. For example, as shown in FIG. 3, antenna 375-1 is separated from antenna 375-2 by distance 378, antenna 375-3 is separated from antenna 375-2 by distance 379, and antenna 375-1 is separated from antenna 375-3 by distance 377. Each of the distances (distance 377, distance 378, and distance 379 in this example) can be based on one or more of a number of factors. For example, each distance can be at least ¼ the wavelength of the RF signals (e.g., RF signals 195). In such a case, one antenna 375 can send/receive a RF signal that is at least 90° out of phase with a RF signal sent/received by another antenna 375. This makes the RF signals (and the information (e.g., angles) associated with them) easier to interpret. As a specific example, if the wavelength of the RF signals 195 is 2.4 GHz, then each distance (distance 377, distance 378, distance 379) is at least approximately ¼ inch. One distance (e.g., distance 377, distance 378, distance 379) can be the same as and/or different than the other distances. In other example embodiments, each distance can be less than ¼ wavelength of the RF signals. While this smaller distance may allow for less precision, enough accuracy can be still be garnered to allow for reliable interpretation of the RF signals.

The sensor device 302 of FIG. 3 also includes a switch 345 that is coupled to the three antennae 375. The sensor device 302 can also include, although not shown in FIG. 3, a control engine (e.g., control engine 106) for automatically operating the switch 345 and a transceiver (e.g., transceiver 124) for sending and/or receiving the RF signals. Further, the object 360 of FIG. 3 includes a communication device 390, which can be substantially the same as the communication device 190 discussed above with respect to FIG. 1. For example, as shown in FIG. 3, the communication device 390 of FIG. 3 can include an antenna. In some cases, the communication device 390 can also include a controller, which can perform at least some of the capabilities of the controller 104 described above.

Figure 4:
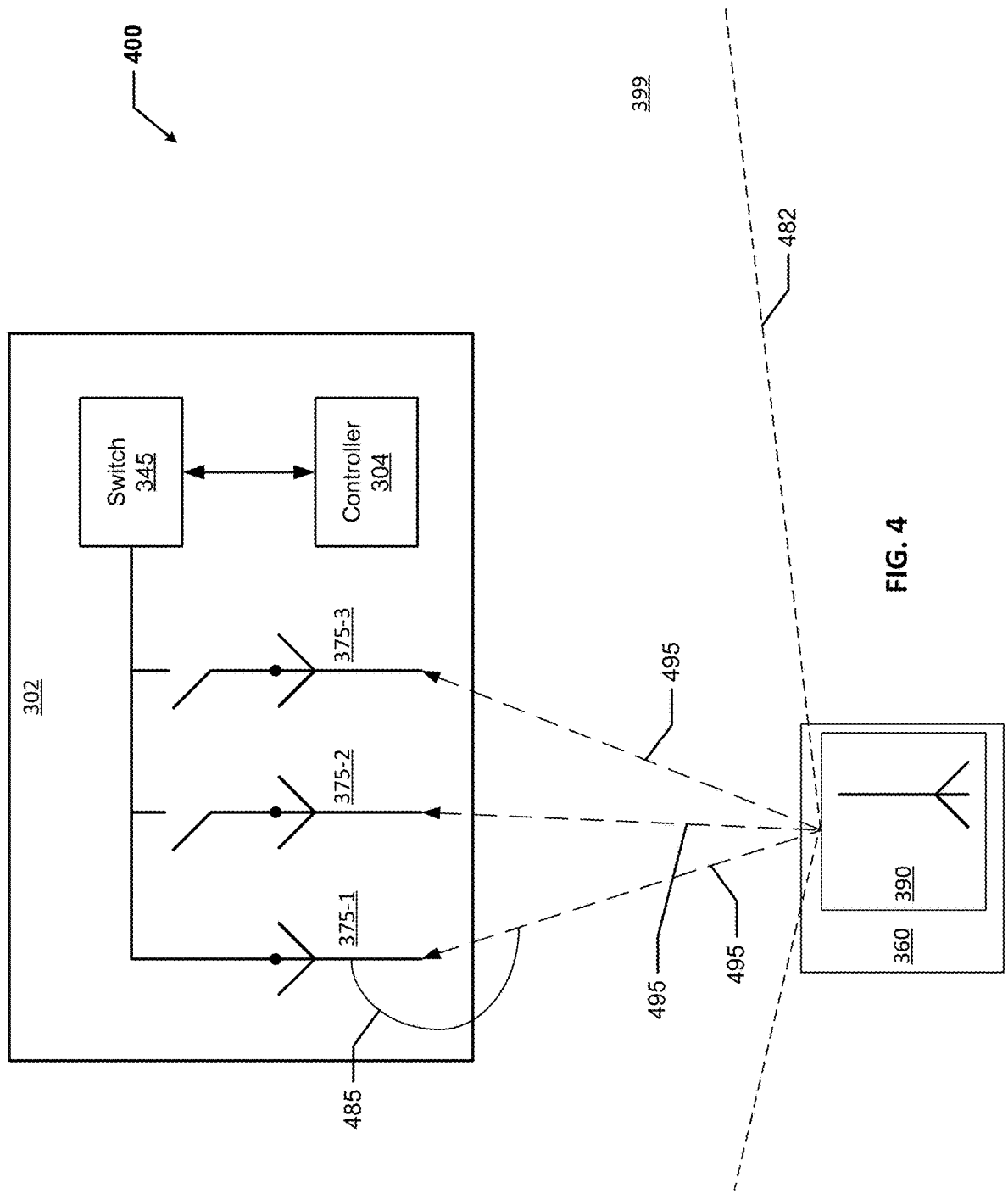
Figure 5:
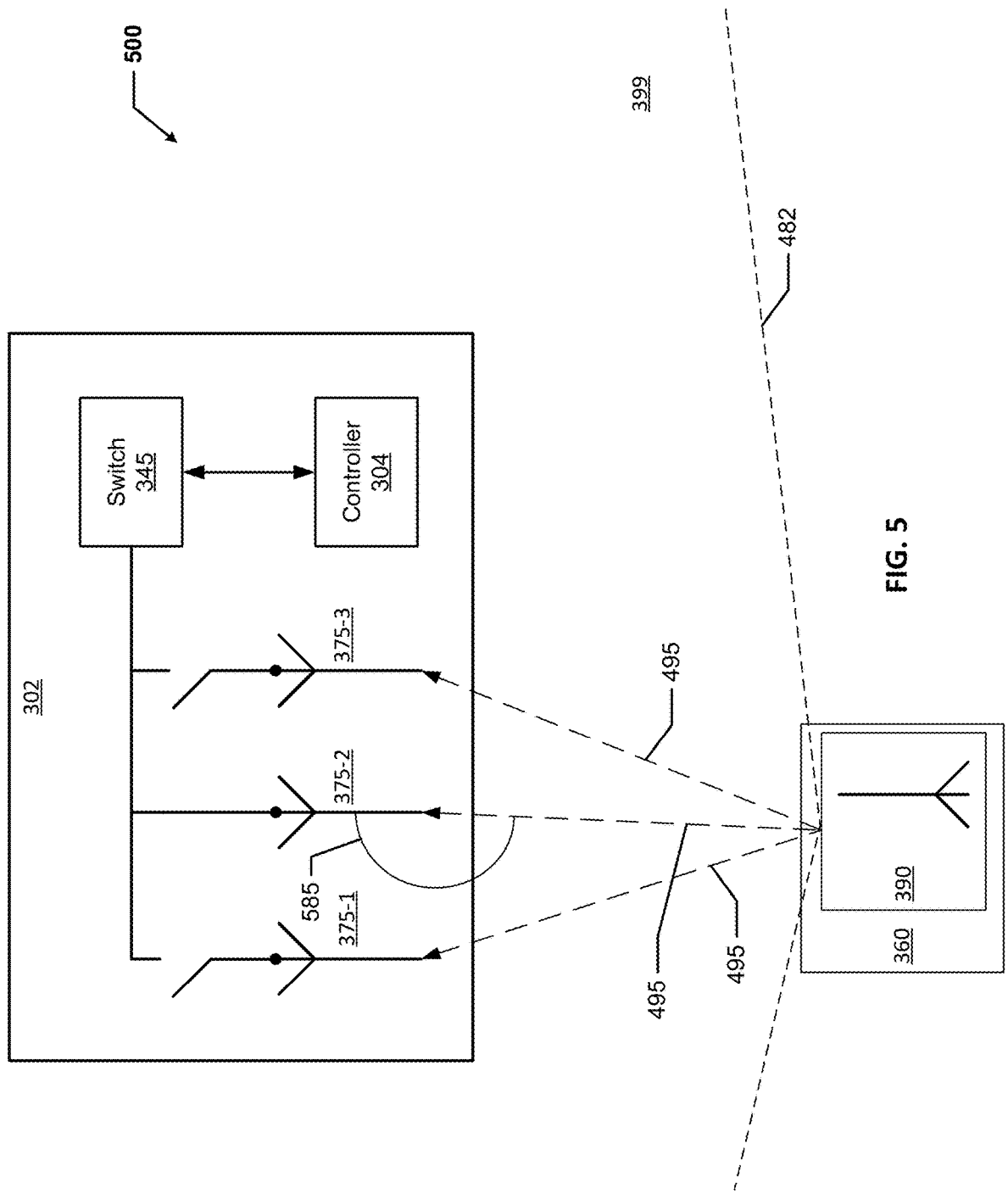

FIGS. 4 through 6 show the system of FIG. 3 when RF signals are sent by the object 360 and the location of the object 360 is determined using an AoA method in accordance with certain example embodiments. FIG. 4 shows the system 400 of FIG. 3 where the communication device 390 of the object 360 begins to broadcast a RF signal 495 in accordance with certain example embodiments. Referring to FIGS. 1 through 6, antenna 375-1, antenna 375-2, and antenna 375-3 of the sensor device 302 receive RF signal 495. The communication device 390 of the object 360 has a broadcast range 482, and all of the antennae 375 of the sensor device 302 fall within the broadcast range 482.

In FIG. 4, the switch 345 in this case is closed for antenna 375-1 and open for antenna 375-2 and antenna 375-3. As a result, only the RF signal 495 received by antenna 375-1 at the point in time captured by FIG. 4 is sent through the switch 345 to the controller 304. When the controller 304 receives the RF signal 495 through antenna 375-1, the controller 304 can use one or more algorithms 133 and/or protocols 132 to determine the angle 485 at which the RF signal 495 arrives (AoA) at antenna 375-1.

At some other subsequent point in time (e.g., 2 ms later, 50 ms later) relative to the time captured in FIG. 4, the controller 304 of the sensor device 302 operates, resulting in the configuration of the system 500 shown in FIG. 5. In FIG. 5, the switch 345 in this case is closed for antenna 375-2 and open for antenna 375-1 and antenna 375-3. As a result, only the RF signal 495 received by antenna 375-2 at the point in time captured by FIG. 5 is sent through the switch 345 to the controller 304. When the controller 304 receives the RF signal 495 through antenna 375-2, the controller 304 can use one or more algorithms 133 and/or protocols 132 to determine the angle 585 at which the RF signal 495 arrives (AoA) at antenna 375-2.

At some other subsequent point in time (e.g., 100 ns later, 3 ms later, 20 ms later) relative to the time captured in FIG. 5, the controller 304 of the sensor device 302 operates, resulting in the configuration of the system 600 shown in FIG. 6. In FIG. 6, the switch 345 in this case is closed for antenna 375-3 and open for antenna 375-2 and antenna 375-1. As a result, only the RF signal 495 received by antenna 375-3 at the point in time captured by FIG. 6 is sent through the switch 345 to the controller 304. When the controller 304 receives the RF signal 495 through antenna 375-3, the controller 304 can use one or more algorithms 133 and/or protocols 132 to determine the angle 685 at which the RF signal 495 arrives (AoA) at antenna 375-3.

Once the controller 304 has determined the angle 485 and the angle 585, the controller 304 can determine the location of the object 360 in two dimensions within the volume of space 399 using the AoA method according to example embodiments. Once the controller 304 has determined the angle 485, the angle 585, and the angle 685 (or even additional angles if the sensor device 302 has more than three antennae 375), the controller 304 can determine the location of the object 360 in three dimensions within the volume of space 399 using the AoA method according to example embodiments.

Figure 7A:
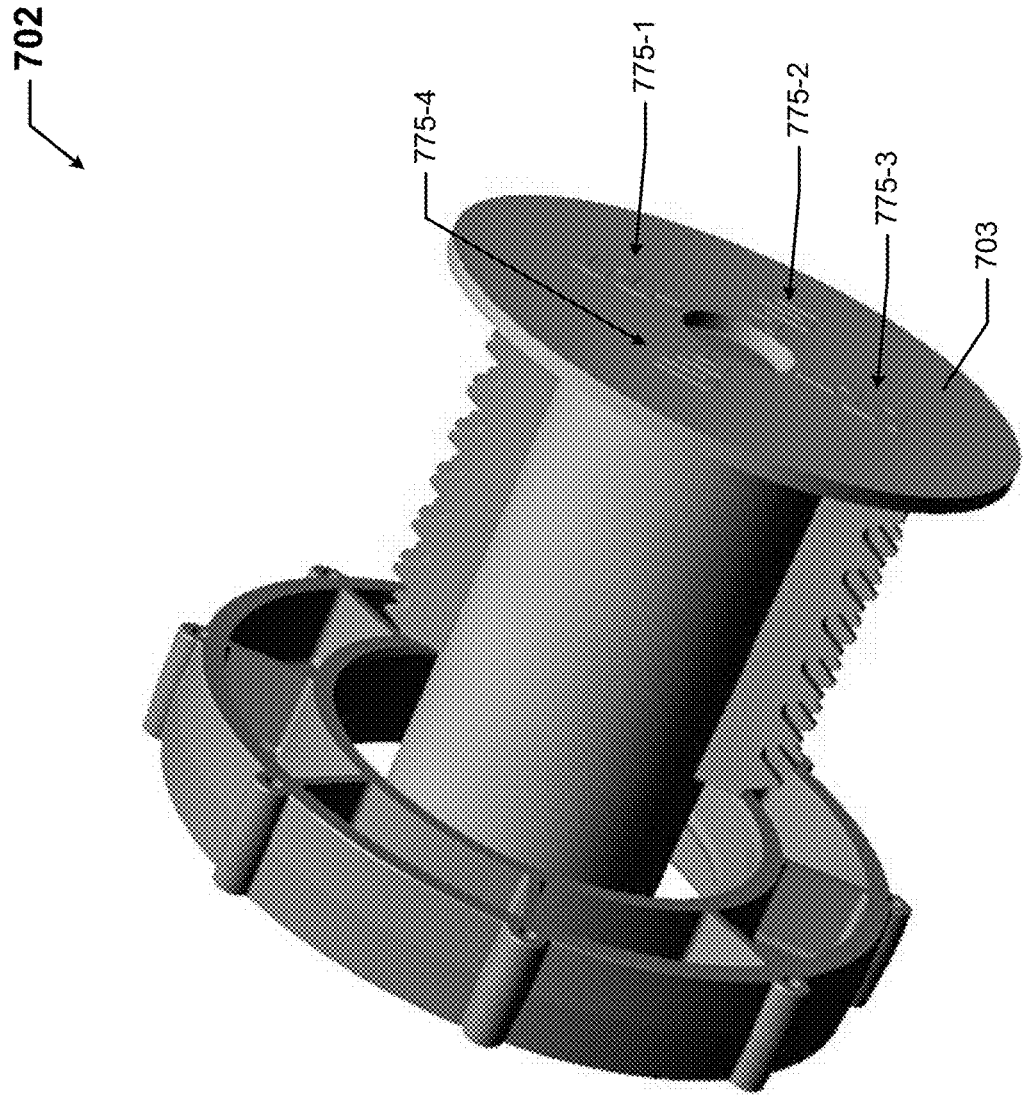
FIGS. 7A-7D show various views of a sensor device in accordance with certain example embodiments.
Figure 7B:
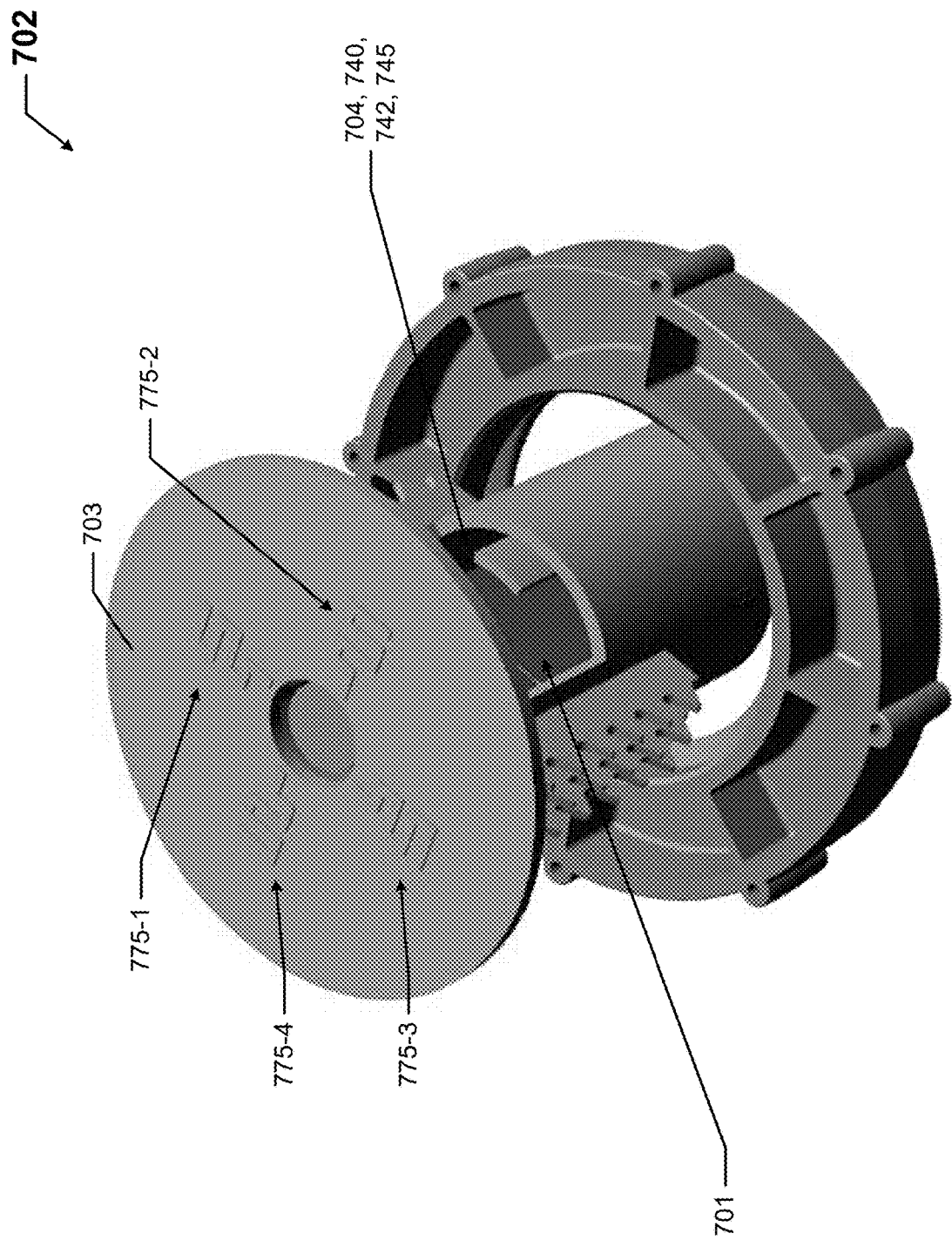
Figure 7C:
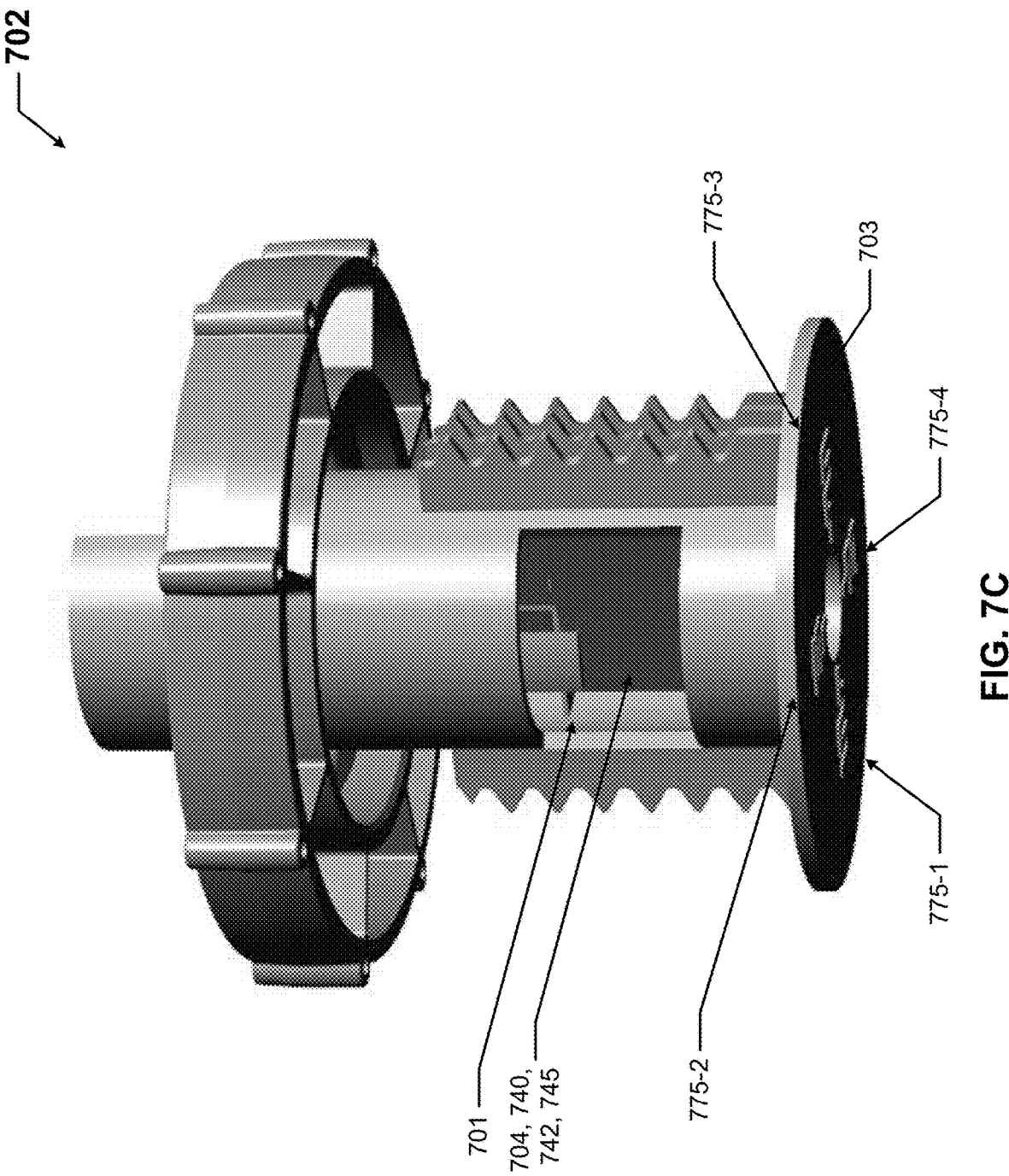
Figure 7D:
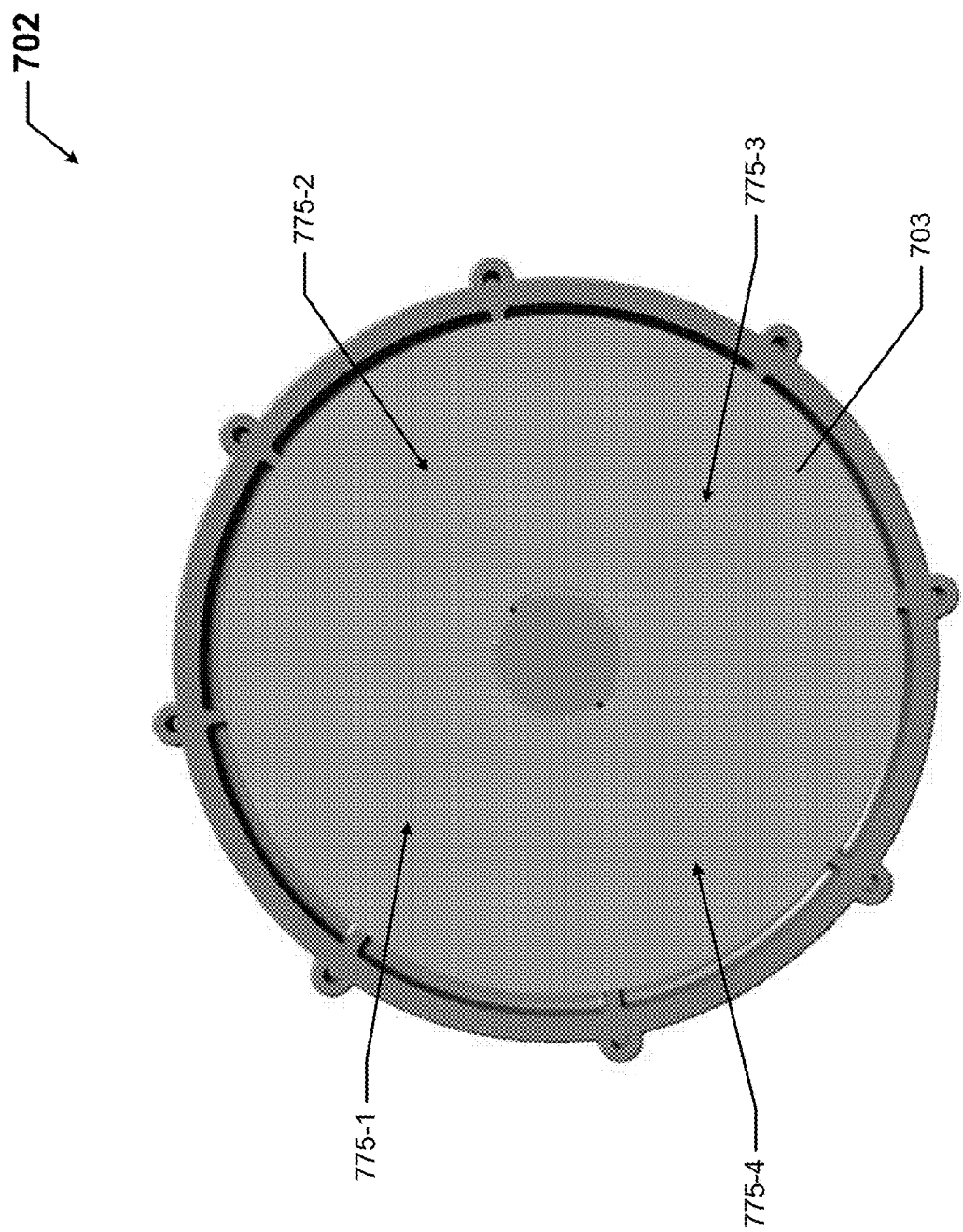

FIGS. 7A through 7D show various views of a sensor device 702 in accordance with certain example embodiments. Specifically, FIG. 7A shows a bottom-side perspective view of the sensor device 702. FIG. 7B shows a different bottom-side perspective view of the sensor device 702. FIG. 7C shows a side view of the sensor device 702. FIG. 7D shows a bottom view of the sensor device 702.

Referring to FIGS. 1 through 7D, the sensor device 702 of FIGS. 7A-7D includes one or more of a number of features and/or components. For example, the sensor device 702 includes a housing 703, on the outer surface of which are disposed four antennae 775 (antenna 775-1, antenna 775-2, antenna 775-3, and antenna 775-4). The four antennae 775 are arranged equidistantly from each other in a circular pattern around a center of the outer surface of the housing 703 on which they are disposed.

In this case, the four antennae 775 have a configuration (e.g., a shape, a size, a thickness) that is substantially identical to each other. Alternatively, one of the antennae 775 can have a configuration that is different than at least one of the other antennae 775. In some cases, rather than being arranged symmetrically with respect to each other, the antennae 775 can be arranged on the housing 703 in any fashion, including but not limited to asymmetrically and randomly.

Further, while there are four antennae 775 shown in this example, there can be two, three, or more than four antennae 775 in other example embodiments. When there are only two antennae 775, the location of an object in a volume of space can be ascertained in two dimensions. When there are three or more antennae 775, the location of an object in a volume of space can be ascertained in three dimensions. One antenna 775 can be made of the same material(s), or of different material(s), compared to the materials of one or more other antennae 775. Further, the manner in which one antenna 775 is coupled to and/or disposed on the housing 703 can be the same as, or different than, the manner in which one or more of the other antennae 775 are coupled to and/or disposed on the housing 703.

Figure 8:
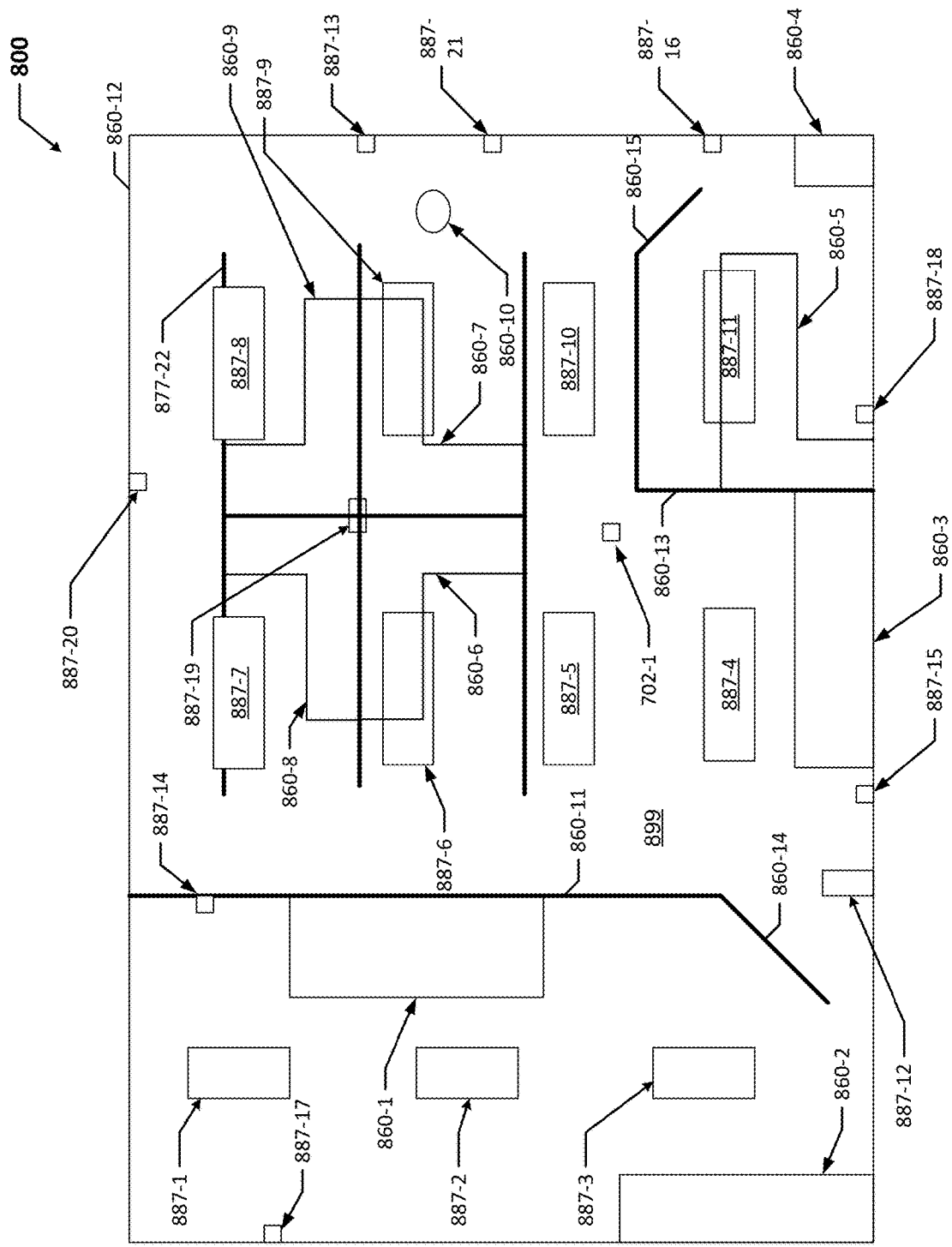
FIG. 8 shows a system in which the example sensor device of FIGS. 7A-7D can be used.

FIG. 8 shows a system in which the example sensor device 702 of FIGS. 7A-7D can be used. Referring to FIGS. 1 through 8, in addition to the sensor device 702, the system 800 includes, disposed in the volume of space 899, various objects 460. Specifically, object 460-1, object 460-2, object 460-3, and object 460-4 are file cabinets. Object 460-5, object 460-6, object 460-7, object 460-8, and object 460-9 are desks. Object 460-10 is a person. Object 460-11, object 460-12, and object 460-13 are walls. Object 460-14 and object 460-15 are doors.

There are also a number of devices 887 in the volume of space 899. Specifically, device 887-1, device 887-2, device 887-3, device 887-4, device 887-5, device 887-6, device 887-7, device 887-8, device 887-9, device 887-10, and device 887-11 are light fixtures. Device 887-12 is an exit sign. Device 887-13 is a thermostat. Device 887-14, device 887-15, and device 887-16 are light switches. Device 887-17, device 887-18, device 887-19, device 887-20, and device 887-21 are electrical receptacles. Device 887-22 are cubicle walls.

The sensor device 702 in this case is disposed in the ceiling adjacent to device 887-4, device 887-5, and device 887-10, and to object 860-13. In alternative embodiments, the sensor device 702 can integrated with an object 860 or device 887. For example, the sensor device 702 can be integrated with the housing of device 887-4, which is a ceiling-mounted light fixture. As another example, the sensor device 702 can be integrated with the faceplate of device 887-13, which is a thermostat. As yet another example, the sensor device 702 can be integrated with object 860-13, which is a wall.

In one or more example embodiments, a sensor device has disposed thereon multiple antenna that can be used to locate an object in a volume of space shared with the sensor device. If two antennae are used, the location of the object can be defined in two dimensions. If three or more antenna are used, the location of the object can be defined in three dimensions. Example embodiments can provide real-time location of an object in a volume of space. Using example embodiments described herein can improve communication, safety, maintenance, costs, and operating efficiency.

Accordingly, many modifications and other embodiments set forth herein will come to mind to one skilled in the art to which sensors with multiple antennae used for multi-dimensional location of an object pertain having the benefit of the teachings presented in the foregoing descriptions and the associated drawings. Therefore, it is to be understood that sensors with multiple antennae used for multi-dimensional location of an object are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for locating an object in a volume of space illuminated by a lighting system, comprising:
   a sensor device comprising a plurality of antennae, coupled to a lighting fixture in the lighting system, and configured to measure at least one parameter used to operate the lighting system;

a switch coupled to the plurality of antennae; and a controller communicably coupled to the switch, wherein the controller:

measures, at a first time, a first angle of a signal received at a first antenna of the plurality of antennae, wherein the first angle of the signal is associated with a location of the object;

operates the switch from a first position to a second position, wherein the first position enables the first antenna, and wherein the second position enables a second antenna of the plurality of antennae;

measures, at a second time, a second angle of the signal received at the second antenna of the plurality of antennae, wherein the second angle of the signal is associated with the location of the object; and determines, using the first angle and the second angle, a multi-dimensional location of the object in the volume of space.

2. The system of claim 1, wherein the controller further:

operates the switch from the second position to a third position, wherein the third position enables a third antenna of the plurality of antennae;

measures a third angle of the signal at the third antenna of the plurality of antennae, wherein the third angle of the signal is associated with the location of the object; and determines, using the first angle, the second angle, and the third angle, a three-dimensional location of the object in the volume of space.

3. The system of claim 1, wherein the signal is a radio frequency signal.

4. The system of claim 1, wherein the first antenna and the second antenna are separated by a distance that is at least ¼ of a wavelength of the first signal.

5. The system of claim 1, wherein the object initiates the signal.

6. The system of claim 1, wherein the controller operates the switch from the first position to the second position upon detecting that the first antenna has received the signal broadcast by the object.

7. The system of claim 1, wherein the signal broadcast by the object includes an identification of the object.

8. The system of claim 1, wherein the multi-dimensional location of the object is determined using an angle of arrival method based on the first angle and the second angle.

9. The system of claim 1, wherein at least one antenna of the plurality of antennae is integrated with an outer surface of the sensor device.

10. The system of claim 1, wherein at least one antenna of the plurality of antennae protrudes from an outer surface of the sensor device.

11. A sensor device, coupled to a lighting fixture in a lighting system, and configured to measure at least one parameter used to operate the lighting system, the sensor device comprising:

a housing;

a plurality of antennae disposed on an outer surface of the housing;

a switch coupled to the plurality of antennae; and a controller communicably coupled to the switch, wherein the controller is configured to:

measure, at a first time, a first angle of a signal received at a first antenna of the plurality of antennae, wherein the first angle of the signal is associated with a location of the object;

operate the switch from a first position to a second position, wherein the first position enables the first antenna, and wherein the second position enables a second antenna of the plurality of antennae;

measure, at a second time, a second angle of the signal received at the second antenna of the plurality of antennae, wherein the second angle of the signal is associated with the location of the object; and determine, using the first angle and the second angle, a multi-dimensional location of the object in the volume of space.

12. The sensor device of claim 11, wherein the controller is disposed within the housing.

13. The sensor device of claim 11, wherein the first antenna and the second antenna have a substantially similar configuration relative to each other and are located a minimum distance apart from each other.

14. The sensor device of claim 11, wherein the first antenna is insert molded into the outer surface of the housing.

15. The sensor device of claim 11, wherein the first antenna is injection molded into the outer surface of the housing.

16. The sensor device of claim 11, wherein the first antenna is adhesive-mounted onto the outer surface of the housing.

17. The sensor device of claim 11, wherein the first antenna is printed onto the outer surface of the housing.

18. The sensor device of claim 11, wherein the first antenna is a chip ceramic antenna that is mounted to the outer surface of the housing.

* * * * *